(12) United States Patent
Willard

(10) Patent No.: US 8,481,328 B1
(45) Date of Patent: Jul. 9, 2013

(54) WATER FLOW PATTERN SIMULATION TANK

(76) Inventor: Adam G. Willard, Bossier City, LA (US)

( * ) Notice: Subject to any disclaimer, the term of this patent is extended or adjusted under 35 U.S.C. 154(b) by 266 days.

(21) Appl. No.: 13/066,307

(22) Filed: Apr. 12, 2011

(51) Int. Cl.
*G09B 9/00* (2006.01)

(52) U.S. Cl.
USPC .......................................................... 436/126

(58) Field of Classification Search
USPC .......................................................... 434/126
See application file for complete search history.

(56) References Cited

U.S. PATENT DOCUMENTS

| | | | | |
|---|---|---|---|---|
| 606,592 A | * | 6/1898 | Snell et al. | 210/264 |
| 3,592,765 A | * | 7/1971 | Rodriguez et al. | 210/167.26 |
| 4,295,965 A | * | 10/1981 | Koster | 210/167.25 |
| 4,552,657 A | * | 11/1985 | Ogawa | 210/167.22 |
| 5,042,425 A | * | 8/1991 | Frost, Jr. | 119/246 |
| 5,171,438 A | * | 12/1992 | Korcz | 210/167.22 |
| 5,282,438 A | * | 2/1994 | McLaughlin | 119/248 |
| 5,306,421 A | * | 4/1994 | Weinstein | 210/151 |
| 5,385,472 A | * | 1/1995 | Mullin | 434/126 |
| 5,597,228 A | * | 1/1997 | Boyle | 362/558 |
| 5,958,239 A | * | 9/1999 | Sing | 210/605 |
| 6,054,045 A | * | 4/2000 | Wittstock et al. | 210/167.01 |
| 6,332,430 B1 | * | 12/2001 | Santa Cruz et al. | 119/256 |
| 6,533,928 B1 | * | 3/2003 | Terato | 210/167.27 |
| 6,666,168 B2 | * | 12/2003 | Stutz et al. | 119/259 |
| 6,709,580 B2 | * | 3/2004 | Ouwinga | 210/167.01 |
| 6,755,981 B2 | * | 6/2004 | Terato | 210/805 |
| RE38,989 E | * | 2/2006 | Wittstock et al. | 210/167.01 |
| 7,033,491 B2 | * | 4/2006 | Chang | 210/167.22 |
| 7,094,335 B2 | * | 8/2006 | Patron | 210/151 |
| 7,244,356 B2 | * | 7/2007 | Olivier | 210/151 |
| 2011/0162585 A1 | * | 7/2011 | Tominaga et al. | 119/259 |
| 2012/0192798 A1 | * | 8/2012 | Kong | 119/226 |
| 2012/0235502 A1 | * | 9/2012 | Kesler et al. | 307/104 |
| 2012/0312744 A1 | * | 12/2012 | Axelrod | 210/615 |

* cited by examiner

*Primary Examiner* — Kurt Fernstrom
*Assistant Examiner* — Dolores Collins
(74) *Attorney, Agent, or Firm* — R. Keith Harrison

(57) ABSTRACT

A water flow pattern simulation tank includes a tank base, a tank aquarium having an aquarium interior carried by the tank base, at least one nozzle in the tank aquarium, at least one drain in the tank aquarium in spaced-apart relationship to the nozzle, a pump disposed in fluid communication with the nozzle and the drain and at least one insert placed in the tank aquarium generally between the nozzle and the drain.

20 Claims, 14 Drawing Sheets

US 8,481,328 B1

WATER FLOW PATTERN SIMULATION TANK

FIELD

The disclosure generally relates to apparatuses which simulate water flow patterns in a river or other body of flowing water. More particularly, the disclosure relates to a water flow pattern simulation tank which simulates water flow patterns produced by various types of obstacles submerged in a body of flowing water for water sport training or other purposes.

BACKGROUND

River sports such as white water rafting, canoeing, kayaking and the like have become increasingly popular over the years. In each of these sports, one or more participants floats down a river or other body of flowing water in a raft, canoe, kayak or other buoyant vessel. Frequently, the participants are required to navigate the vessel over or around various submerged obstacles such as rocks, fallen tree limbs and the like in the body of water typically by manipulating oars which are submerged in the water to steer the vessel. The speed of the flowing water, as well as the number and types of obstacles which are encountered, offers a challenge to both the skill and the safety of the participants. Therefore, it is important that participants in river sports be properly trained in order to safety participate in these sports.

The types of obstacles which may be submerged in a flowing water body and potentially encountered by a river sport participant include man-made structures such as bridges and dams as well as natural structures such as rocks and fallen trees. The submerged obstacles create a distinctive water flow pattern depending on the type of obstacle. Therefore, it may be desirable for a participant in a river sport to recognize the water flow patterns created by various obstacles which may be submerged in a body of flowing water. Recognition of the water flow pattern may enable the participant to safely navigate over or around the submerged obstacle during the course of floating the water body.

Accordingly, a water flow pattern simulation tank which simulates water flow patterns produced by various types of obstacles submerged in a body of flowing water is needed for water sport training or other purposes.

SUMMARY

The disclosure is generally directed to a water flow pattern simulation tank which simulates water flow patterns produced by various types of obstacles submerged in a body of flowing water for water sport training or other purposes. An illustrative embodiment of the water flow pattern simulation tank includes a tank base; a tank aquarium having an aquarium interior carried by the tank base; at least one nozzle in the tank aquarium; at least one drain in the tank aquarium in spaced-apart relationship to the at least one nozzle; a pump disposed in fluid communication with the at least one nozzle and the at least one drain; and at least one insert placed in the tank aquarium generally between the at least one nozzle and the at least one drain.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 16:
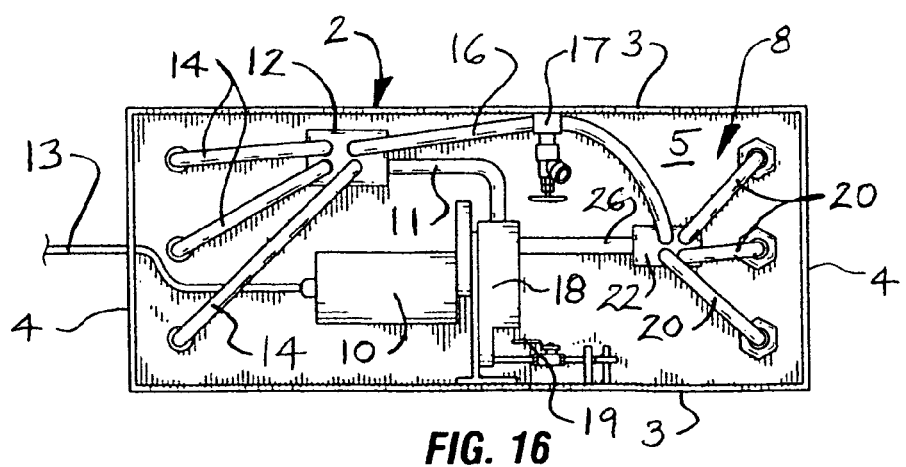
FIG. 16 is a bottom view of an illustrative embodiment of the water flow pattern simulation tank.

Referring initially to FIGS. 1-3 and 16 of the drawings, an illustrative embodiment of the water flow pattern simulation tank is generally indicated by reference numeral 1. The water flow pattern simulation tank 1 may include a tank base 2 which may have a generally elongated, rectangular shape in some embodiments, as illustrated. In other embodiments, the tank base 2 may have alternative shapes. The rectangular tank base 2 may include a pair of generally elongated, parallel, spaced-apart side base panels 3; a pair of end base panels 4 connecting the side base panels 3; and a top base panel 5 on the side base panels 3 and the end base panels 4. As illustrated in FIG. 16, a tank base interior 8 may be defined by and between the side base panels 3, the end base panels 4 and the top base panel 5 of the tank base 2.

A transparent tank aquarium 32 may be provided on the tank base 2. The tank aquarium 32 may include a pair of generally elongated, parallel, spaced-apart aquarium side walls 33 and aquarium end walls 34 extending between the aquarium side walls 33. An aquarium interior 38 may be defined by and between the aquarium side walls 33 and the aquarium end walls 34. The aquarium side walls 33 and the aquarium end walls 34 of the tank aquarium 32 may be polymethylmethacrylate (PLEXIGLASS) or other transparent material which is suitable for the purpose.

At least one panel insert groove 35 may be provided in the aquarium interior 35 of the tank aquarium 32. Each panel insert groove 35 may include a pair of side insert grooves 36 provided in the interior surfaces of the respective aquarium side walls 33 of the tank aquarium 32. The side insert grooves 36 are disposed in aligned or registering relationship to each other. At least one bottom insert groove 37 may be provided in the upper surface of the top base panel 5 of the tank base 2. The bottom insert groove 37 extends across the width of the top base panel 5 and is disposed in registering or aligned relationship to the aligned or registering side insert grooves 36. In some embodiments, a series of panel insert grooves 35 may include multiple side insert grooves 36 provided in the interior surface of each aquarium side wall 33 in generally parallel, spaced-apart relationship to each other, as illustrated. Bottom insert grooves 37 in the top base panel 5 may extend between the respective pairs of registering or aligned side insert grooves 36. The purpose of the panel insert grooves 35 will be hereinafter described.

Figure 1:
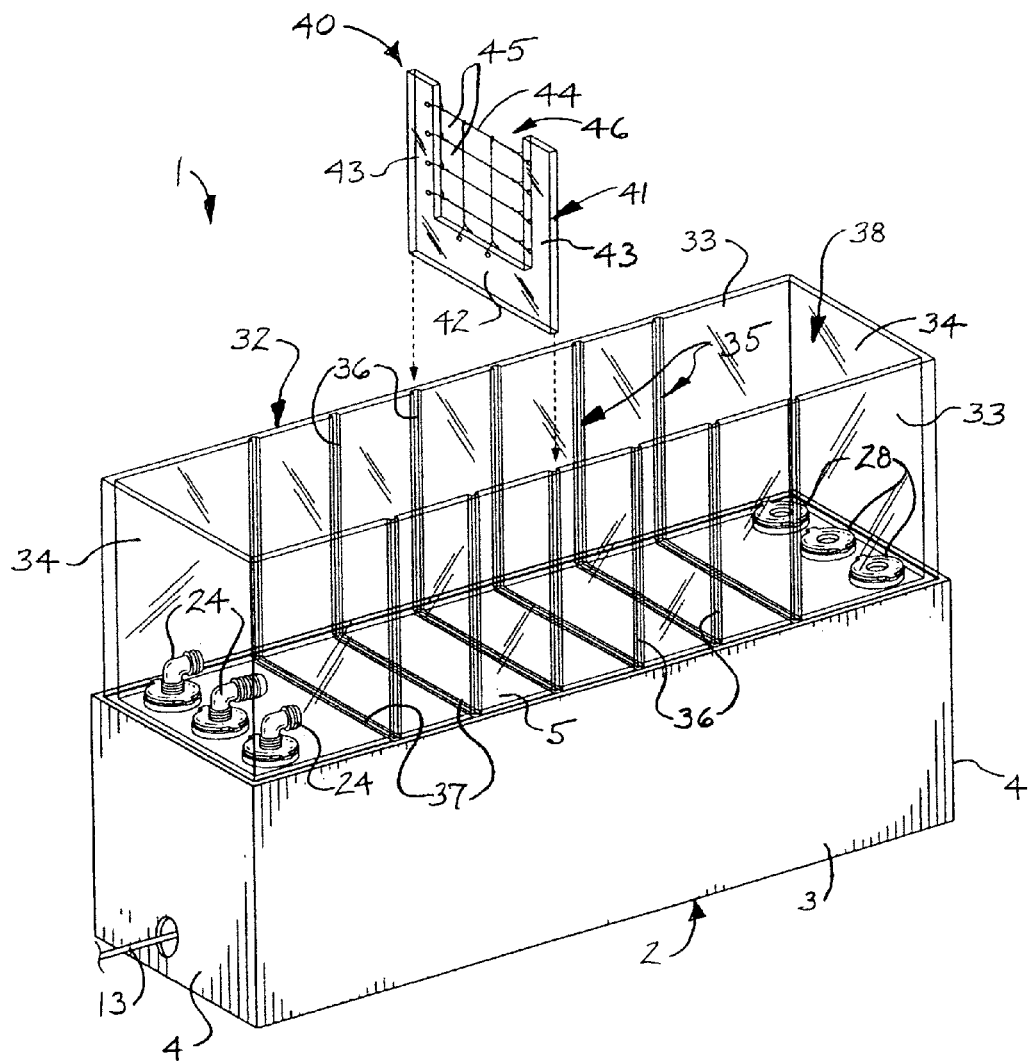
FIG. 1 is an exploded perspective view of an illustrative embodiment of the water flow pattern simulation tank, more particularly illustrating insertion of a strainer insert into the tank to simulate a water flow pattern which would be produced by a similar structure submerged beneath a body of flowing water.
Figure 2:
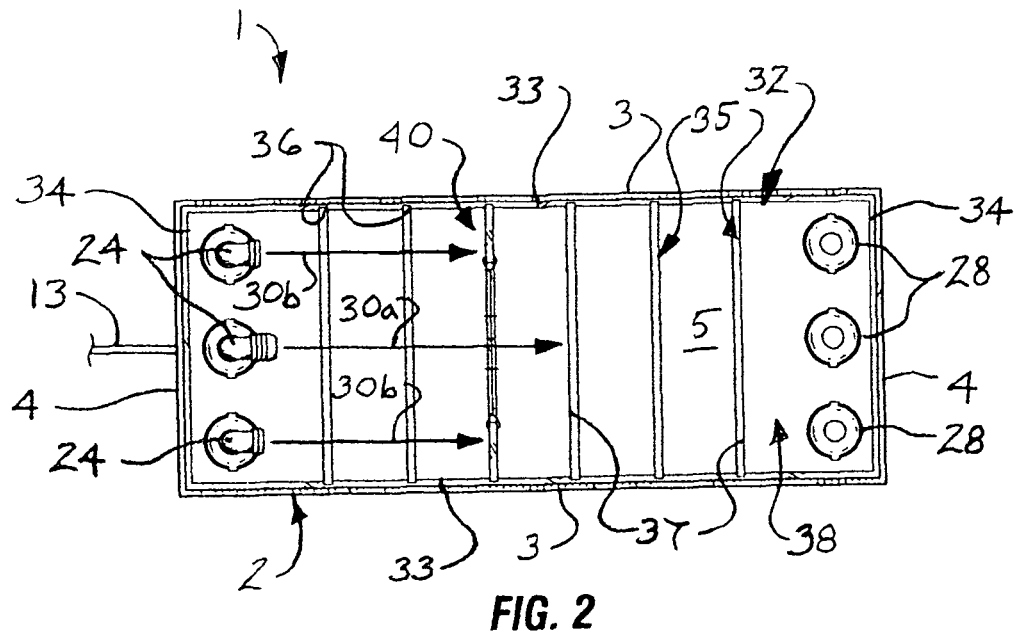
FIG. 2 is a top view of the water flow pattern simulation tank illustrated in FIG. 1, more particularly illustrating a horizontal flow pattern of the water as the water flows over the submerged strainer.
Figure 3:
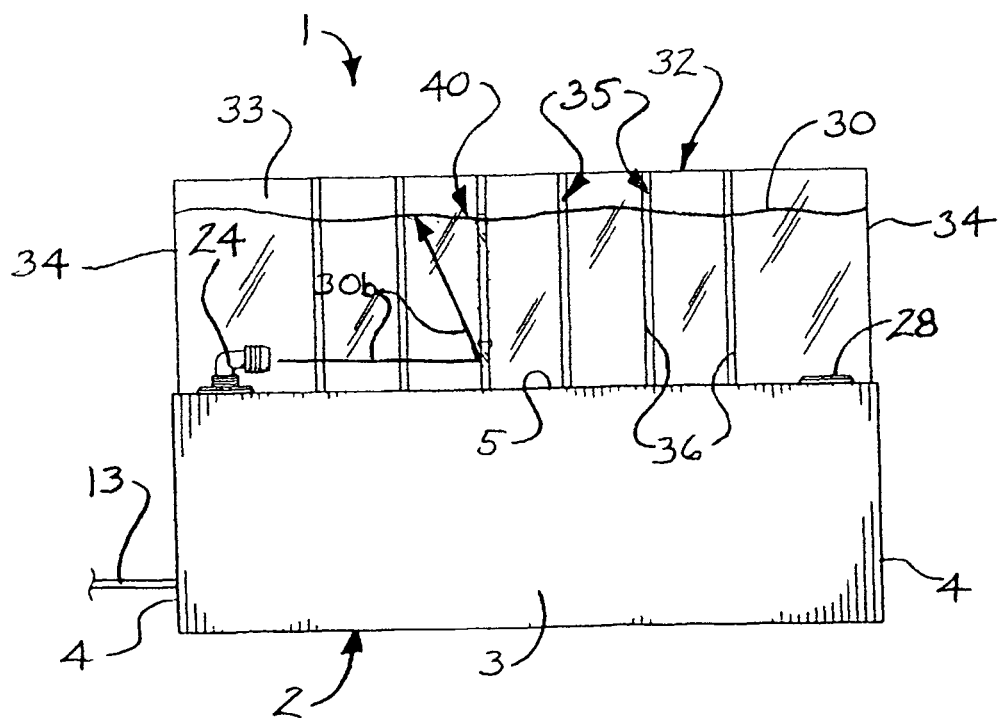
FIG. 3 is a side view of the water flow pattern simulation tank illustrated in FIG. 1, more particularly illustrating a vertical flow pattern of the water as the water flows over the submerged strainer structure.

As illustrated in FIG. 16, a tank pump 10 may be contained in the tank base interior 8 of the tank base 2. A pump power cord 13 may be electrically connected to the tank pump 10. A pump outlet housing 18 may communicate with the tank pump 10. In some embodiments, a flow control handle 19 may interface with the pump outlet housing 18 for purposes which will be hereinafter described. A pump outlet conduit 11 may communicate with the pump outlet housing 18. A nozzle conduit manifold 12 may communicate with the pump outlet conduit 11. At least one nozzle conduit 14 may communicate with the nozzle conduit manifold 12 for purposes which will be hereinafter described. As illustrated in FIGS. 1-3, at least one nozzle 24 may be provided on the top base panel 5 generally at a first end of the tank base 2. Each nozzle 24 may be disposed in fluid communication with a corresponding nozzle conduit 14 (FIG. 16).

As further illustrated in FIG. 16, a tank fill conduit 16 may communicate with the nozzle conduit manifold 12. A drain conduit manifold 22 may communicate with the tank fill conduit 16. At least one drain conduit 20 may communicate with the drain conduit manifold 22 for purposes which will be hereinafter described. As further illustrated in FIGS. 1-3, at least one drain 28 may be provided in the top base panel 5 generally at a second end of the tank base 2. Each drain 28 may be disposed in fluid communication with a corresponding drain conduit 20 (FIG. 16). As illustrated in FIG. 16, a connecting conduit 26 may connect the drain conduit manifold 22 to the pump outlet housing 18. In some embodiments, a drain spigot 17 may be provided in the tank fill conduit 16 to facilitate draining of the aquarium interior 38 of the tank aquarium 32 as will be hereinafter described.

As will be hereinafter further described, a supply of water 30 can be placed in the aquarium interior 38 of the tank aquarium 32. By operation of the tank pump 10 (FIG. 16), the water 30 can be continually circulated from the aquarium interior 38 through the drains 28, the drain conduits 20 (FIG. 16), the drain conduit manifold 22, the connecting conduit 26, the pump outlet housing 18, the pump outlet conduit 11, the nozzle conduit manifold 12 and the nozzle conduits 14 and back into the aquarium interior 38 through the nozzles 24. In some embodiments, the rate of flow or pressure of the water 30 as it flows into and through the aquarium interior 38 can be selectively regulated by manipulation of the flow control handle 19. In some embodiments, after use of the water flow pattern simulation tank 1, the water 30 can be selectively drained from the aquarium interior 38 through the drain spigot 17 (FIG. 16) in the tank fill conduit 16.

In application of the water flow pattern simulation tank 1, a variety of removable inserts which will be hereinafter described can be positioned in the panel insert grooves 35 in the aquarium interior 38. The various inserts impart distinctive flow patterns to the water 30 as the water 30 flows from the nozzles 24 to the drains 28 in the aquarium interior 38. The flow pattern of the water 30 as it flows through the aquarium interior 38 can be observed through the transparent aquarium side walls 33 and aquarium end walls 34 of the tank aquarium 32. Accordingly, the water flow pattern simulation tank 1 can be used to train participants in a river sport to recognize the types of water flow patterns which can be created by various submerged obstacles that may potentially be encountered while floating a river or other flowing water body. Recognition of the water flow patterns may enable the participants to safely navigate over or around the obstacles during the course of floating the water body, as will be hereinafter described.

Referring again to FIGS. 1-3 of the drawings, in one exemplary application of the water flow pattern simulation tank 1, a strainer insert 40 is inserted in a selected panel insert groove 35 in the aquarium interior 38 of the tank aquarium 32. As illustrated in FIG. 1, in some embodiments, the strainer insert 40 may include a generally U-shaped strainer insert frame 41 with a frame base portion 42 and a pair of generally parallel, spaced-apart frame side portions 43 extending from the frame base portion 42. A frame opening 46 may be defined by and between the frame base portion 42 and the frame side portions 43. A strainer mesh 44 having mesh openings 45 may be provided in the frame opening 46. Accordingly, the strainer insert frame 41 may be inserted in the selected panel insert groove 35, as illustrated in FIG. 1, between the nozzles 24 and the drains 28 at respective ends of the aquarium interior 38. The aquarium interior 38 of the tank aquarium 32 is substantially filled with a supply of water 30 (FIG. 3) such as by using a hose (not illustrated) which is connected to a water source (not illustrated). The tank pump 10 (FIG. 16) is connected to an electrical source (not illustrated) through the pump power cord 13 and then operated to continually pump the water 30 from the aquarium interior 38 through the drains 28 and discharge the water 30 back into the aquarium interior 38 through the nozzles 24.

As it flows through the aquarium interior 38 from the nozzles 24 to the drains 28, the water 30 encounters the strainer insert 40, forming a water flow pattern which is distinctive to the configuration of the submerged strainer insert 40. Trainees or participants (not illustrated) in a river sport view the water flow pattern which is produced by the submerged strainer insert 40 through the transparent aquarium side walls 33 and the aquarium end walls 34. Accordingly, as illustrated in FIG. 2, a middle portion 30a of the water 30 flows straight through the strainer mesh 44 of the strainer insert 40 while side portions 30b of the water 30 flow against the respective frame side portions 43 of the strainer insert frame 41. Consequently, as illustrated in FIG. 3, the side portions 30b of the water 30 which flow against the respective frame side portions 43 of the strainer insert frame 41 are deflected backwards and upwards, welling up to the surface of the water 30. Therefore, the water flow pattern which is characterized by the forward-flowing middle water portion 30a and the upward-flowing and surface-welling side water portions 30b in the tank aquarium 32 would indicate that a structure which is similar to the strainer insert 40 is submerged beneath a flowing water body should the participants observe the same water flow pattern while floating a vessel on the flowing water body while participating in a water sport. An instructor can instruct the participants to navigate the floating vessel along the middle water portion 30a or around the side water portions 30b depending on the instructor's judgment and other factors which may come into play as the submerged strainer structure is encountered to prevent the vessel from becoming stuck or damaged or to prevent injury to the participants for example.

Figure 4:
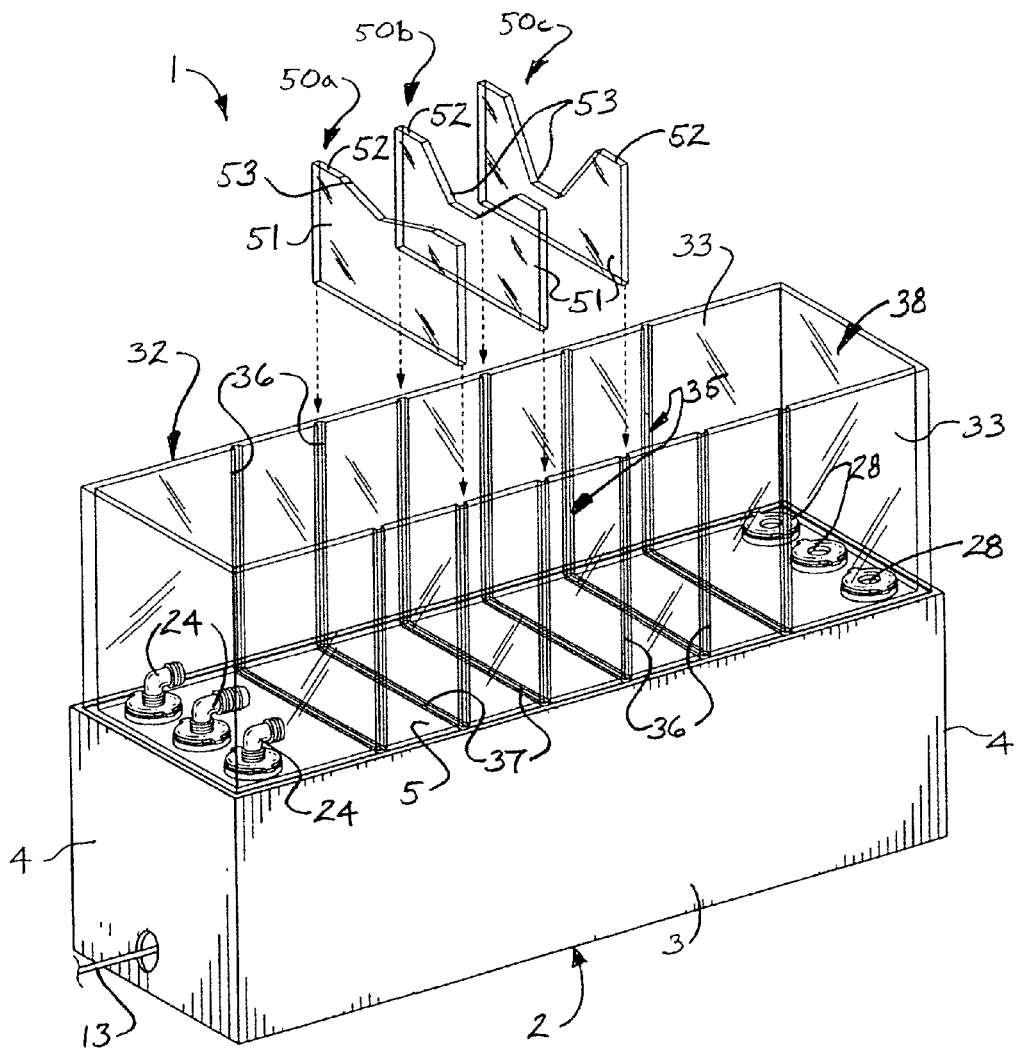
FIG. 4 is an exploded perspective view of an illustrative embodiment of the water flow pattern simulation tank, more particularly illustrating insertion of multiple successive downstream inserts into the tank to simulate a water flow pattern which would be produced by a descending surface or surfaces formed by rocks or other structures submerged beneath a body of flowing water.
Figure 5:
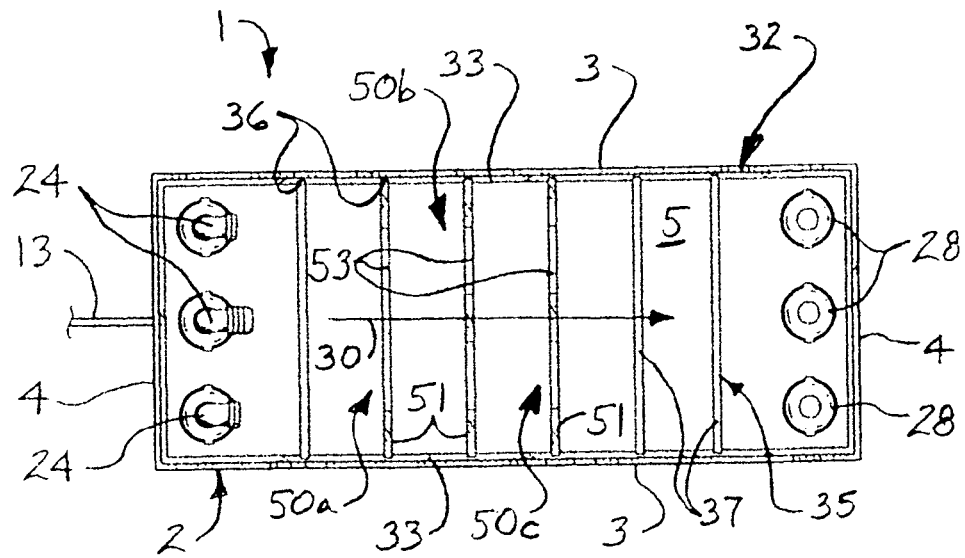
FIG. 5 is a top view of the water flow pattern simulation tank illustrated in FIG. 4, more particularly illustrating a horizontal flow pattern of the water as the water flows over the submerged descending surface or surfaces.
Figure 6:
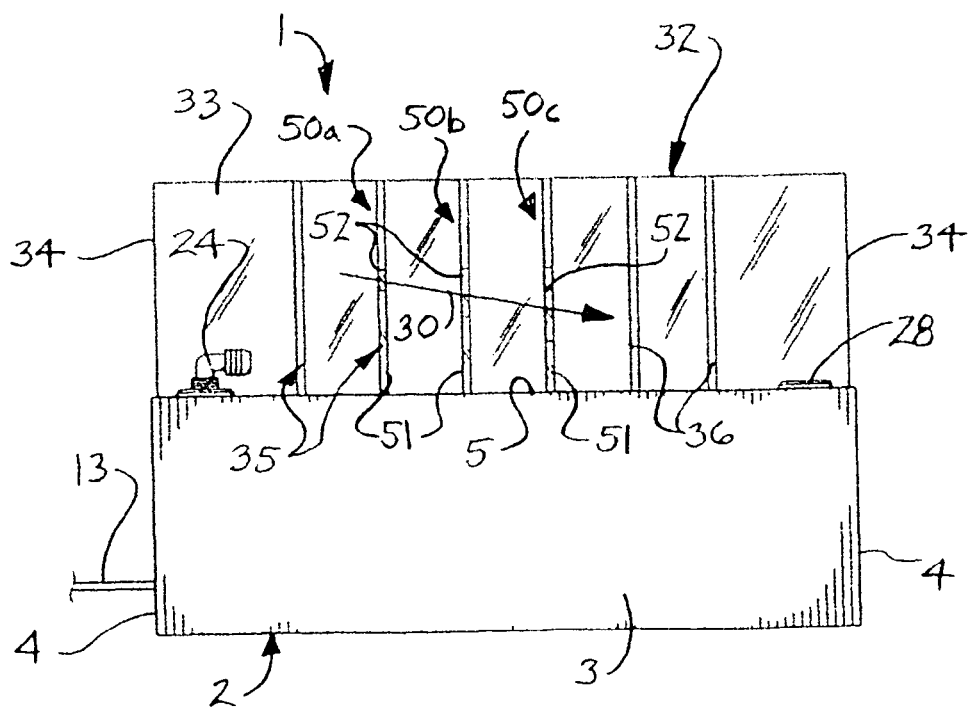
FIG. 6 is a side view of the water flow pattern simulation tank illustrated in FIG. 4, more particularly illustrating a vertical flow pattern of the water as the water flows over the submerged descending surface or surfaces.

Referring next to FIGS. 4-6 of the drawings, in an alternative application of the water flow pattern simulation tank 1, multiple downstream inserts 50 (designated by reference numerals 50a, 50b and 50c, respectively) are inserted into respective sets of panel insert grooves 35 in the aquarium interior 38 of the tank aquarium 32. Each downstream insert 50a, 50b, 50c may include a generally rectangular insert panel 51 having a panel upper edge 52. A generally V-shaped or U-shaped panel notch 53 is provided in the panel upper edge 52 of each insert panel 51. The panel notches 53 of the downstream inserts 50a, 50b and 50c, respectively, may progressively increase in depth from the nozzles 24 to the drains 28. Accordingly, the downstream inserts 50a, 50b and 50c simulate a submerged structure or structures having a like configuration in a flowing water body. The sloped structure or structures may be the bed or bottom surface of the water body or may be one or more submerged natural objects such as rocks or one or more submerged manmade structures beneath the surface of the water body.

As it flows through the aquarium interior 38 from the nozzles 24 to the drains 28, the water 30 successively encounters the downstream inserts 50a, 50b and 50c, forming a water flow pattern which is distinctive to the configuration of the inserts. Accordingly, as illustrated in FIG. 5, the water 30 flows through the panel notches 53 in the upper edges 52 of the respective downstream inserts 50a, 50b and 50c. As illustrated in FIG. 6, the water 30 flows in a downward path due to the increasing depth of the panel notches 53 in the respective inserts. Therefore, the water flow pattern which is characterized by the forward-flowing and downward-flowing water 30 in the tank aquarium 32 would indicate that a structure or structures which resemble(s) the downstream inserts 50a, 50b and 50c is/are beneath a flowing water body in the event that the participants were to observe the same water flow pattern while participating in a water sport on a flowing water body. An instructor can instruct the participants to navigate a floating vessel either over or around the flowing water 30 depending on the instructor's judgment and other factors which may come into play as the submerged structure is encountered.

Figure 7:
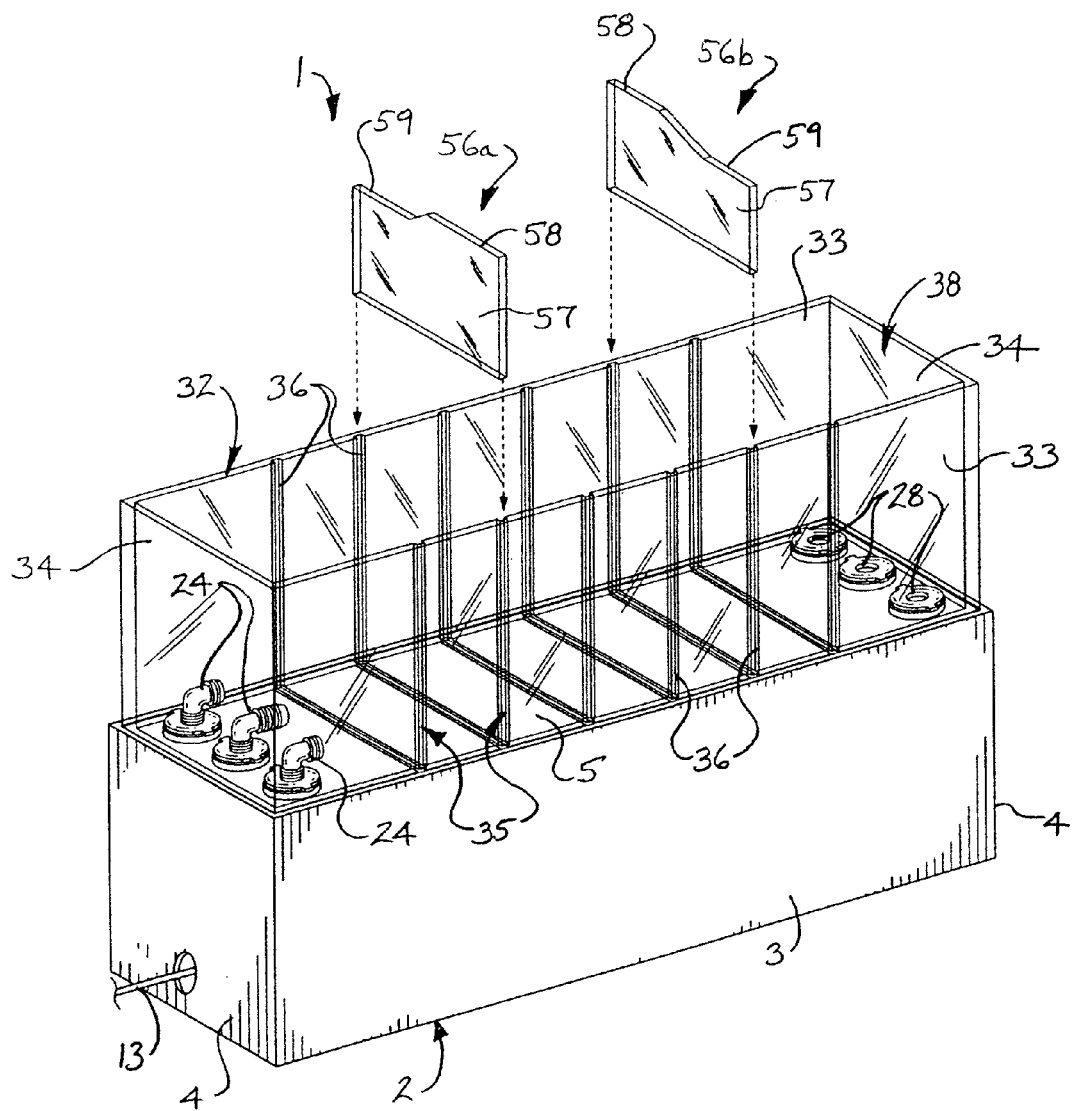
FIG. 7 is an exploded perspective view of an illustrative embodiment of the water flow pattern simulation tank, more particularly illustrating insertion of a pair of meandering inserts into the tank to simulate a meandering water flow pattern which would be produced by a similar structure submerged in the body of flowing water.
Figure 8:
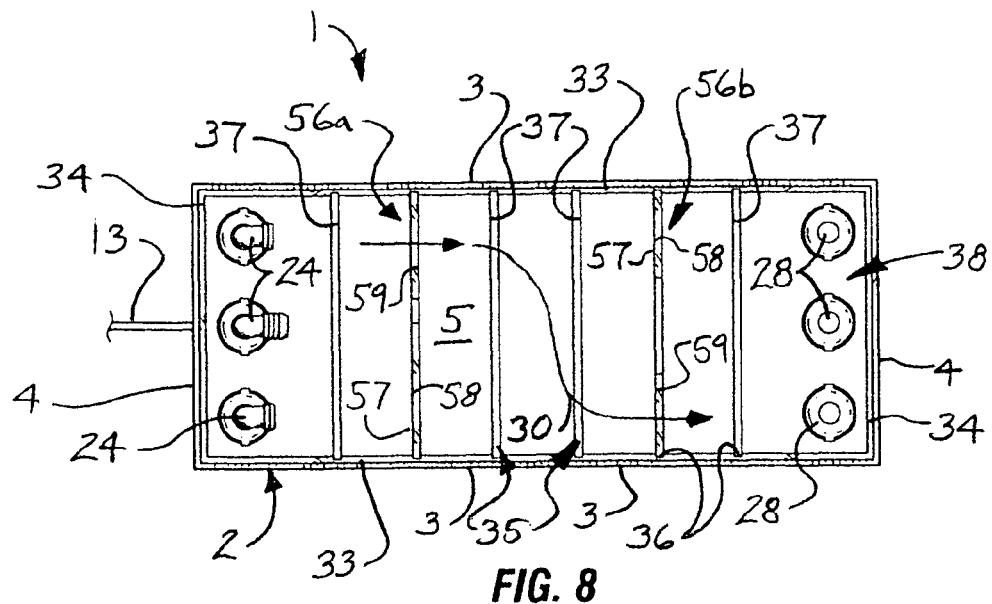
FIG. 8 is a top view of the water flow pattern simulation tank illustrated in FIG. 4, more particularly illustrating a horizontal flow pattern of the meandering water.
Figure 9:
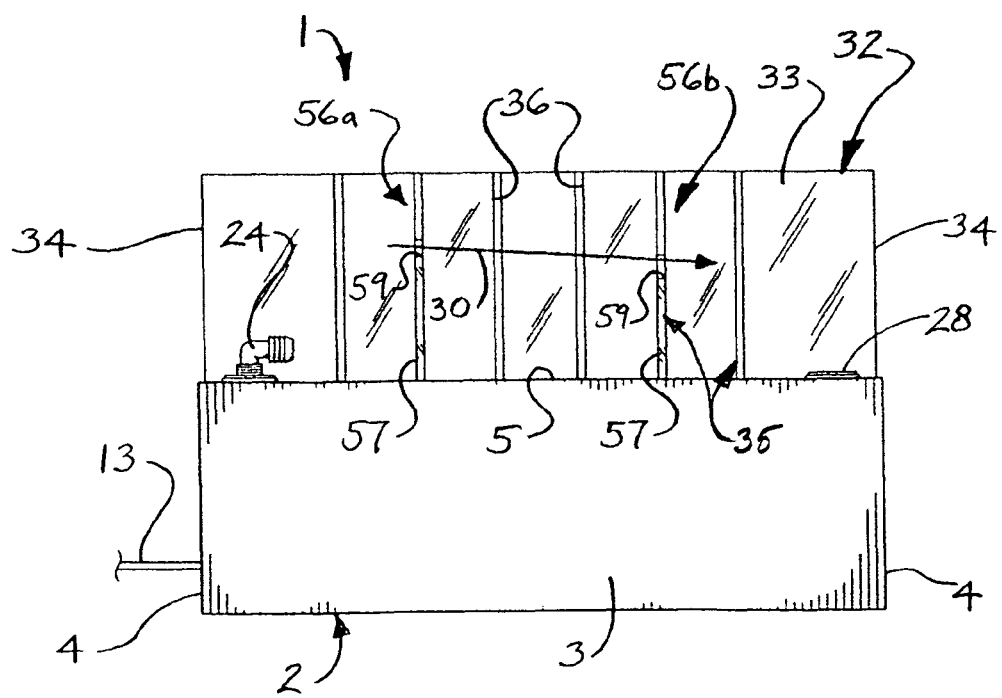
FIG. 9 is a side view of the water flow pattern simulation tank illustrated in FIG. 4, more particularly illustrating a vertical flow pattern of the meandering water.

Referring next to FIGS. 7-9 of the drawings, in another alternative application of the water flow pattern simulation tank 1, meandering inserts 56 which may include a first meandering insert 56a and a second meandering insert 56b are inserted into respective panel insert grooves 35 in the aquarium interior 38 of the tank aquarium 32. Each meandering insert 56a and 56b may include a generally rectangular meandering insert panel 57 having a panel upper edge 58. A panel notch 59 is provided in the panel upper edge 58 adjacent to one side of the insert panel 57 of the first meandering insert 56a. A panel notch 59 is provided in the panel upper edge 58 adjacent to the opposite side of the insert panel 57 of the second meandering insert 56b. Therefore, as illustrated in FIG. 8, the panel notches 59 of the respective meandering inserts 56a and 56b are misaligned since they are positioned on opposite sides of the aquarium interior 38 of the tank aquarium 32. Accordingly, the meandering inserts 56a and 56b may simulate a submerged structure having the corresponding configuration in a flowing water body. The submerged structure may be the bed or bottom surface of the water body or may be submerged natural objects such as rocks or a submerged manmade structure beneath the surface of the water body.

As it flows through the aquarium interior 38 from the nozzles 24 to the drains 28, the water 30 successively encounters the first meandering insert 56*a* and the second meandering insert 56*b*, forming a water flow pattern which is distinctive to the configuration of the meandering inserts 50. Accordingly, as illustrated in FIG. 8, the water 30 flows through the panel notches 59 in the upper panel edges 58 of the respective meandering inserts 50*a* and 50*b*. Because the panel notches 59 in the respective meandering inserts 50*a* and 50*b* are on opposite sides of the aquarium interior 38, the flowing water 30 meanders from one side the other side of the aquarium interior 38, as illustrated in FIG. 8. In the vertical dimension, the water 30 may flow in a straight pattern or in a generally downward pattern (FIG. 9) from the first meandering insert 50*a* to the second meandering insert 50*b*. Therefore, the water flow pattern which is characterized by the forward-flowing water 30 in the tank aquarium 32 would indicate that a similar structure or structures is/are submerged beneath a flowing water body in the event that the participants were to observe the same water flow pattern while participating in a water sport on a flowing water body. An instructor can instruct the participants to navigate a floating vessel either along or around the flowing water 30 depending on the instructor's judgment and other factors which may come into play as the submerged structure is encountered.

Figure 10:
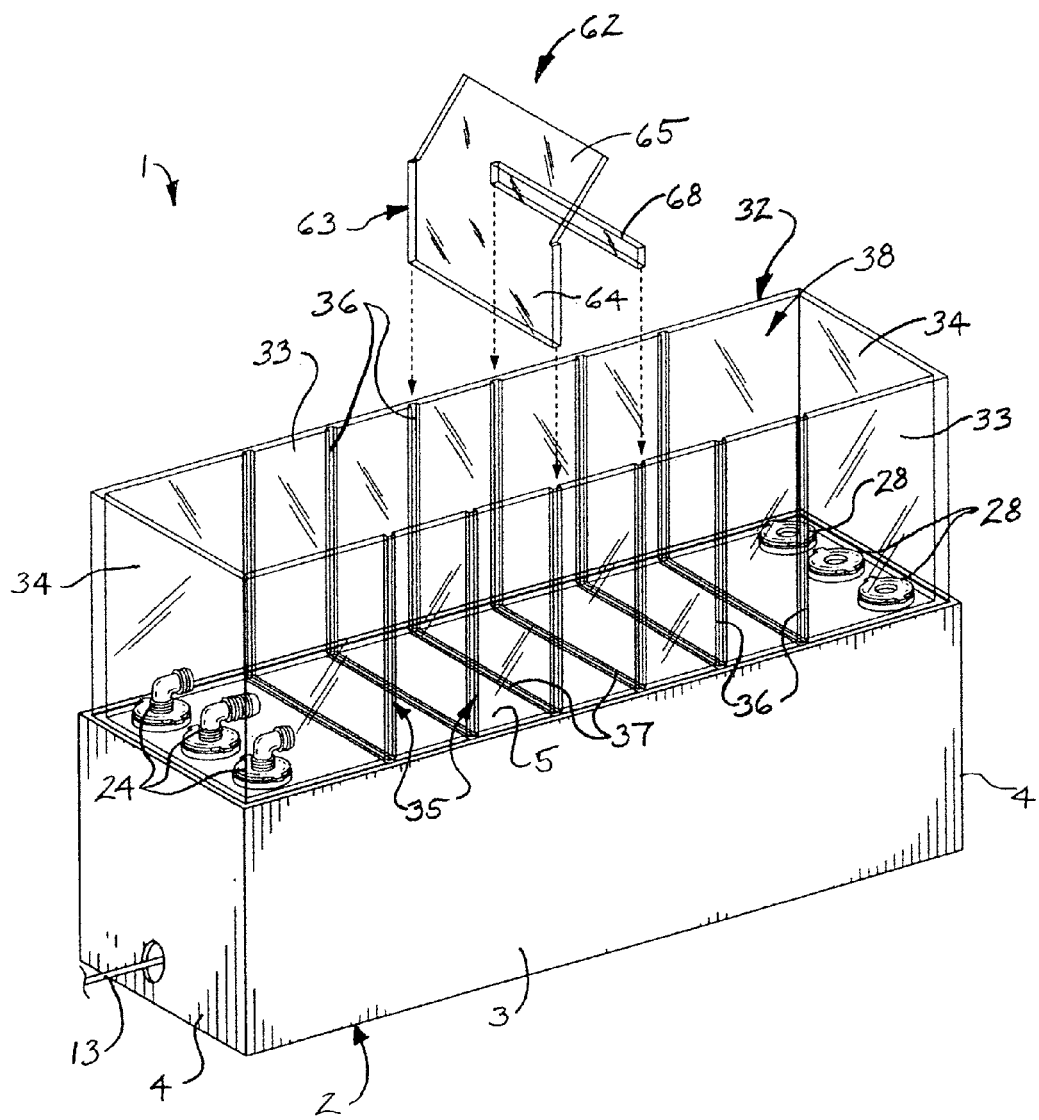
FIG. 10 is an exploded perspective view of an illustrative embodiment of the water flow pattern simulation tank, more particularly illustrating insertion of a low head dam insert into the tank to simulate a water flow pattern which would be produced by a low head dam submerged beneath a body of flowing water.
Figure 11:
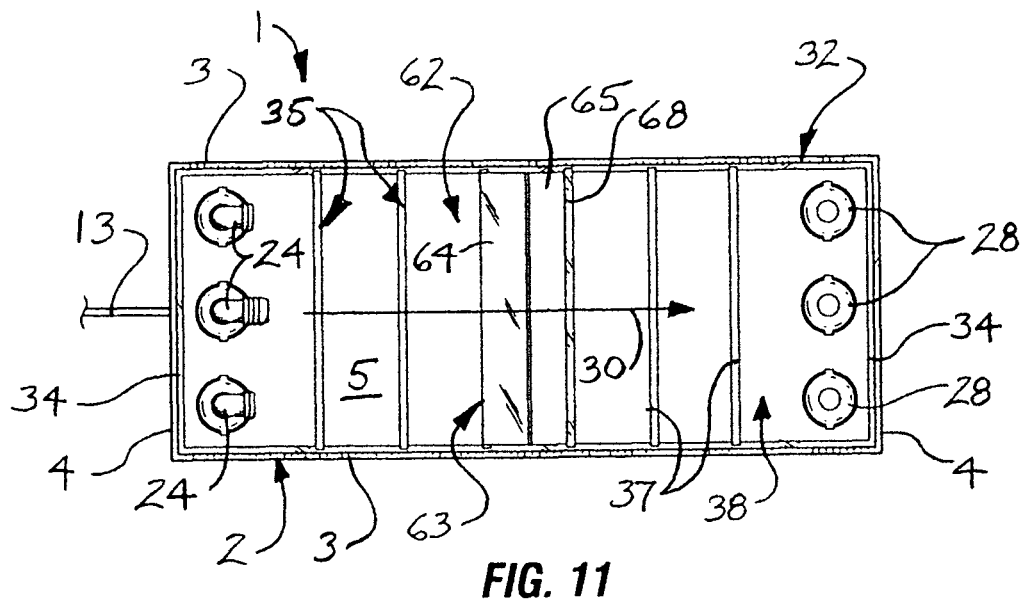
FIG. 11 is a top view of the water flow pattern simulation tank illustrated in FIG. 10, more particularly illustrating a horizontal flow pattern of the water as the water flows over the submerged low head dam insert.
Figure 12:
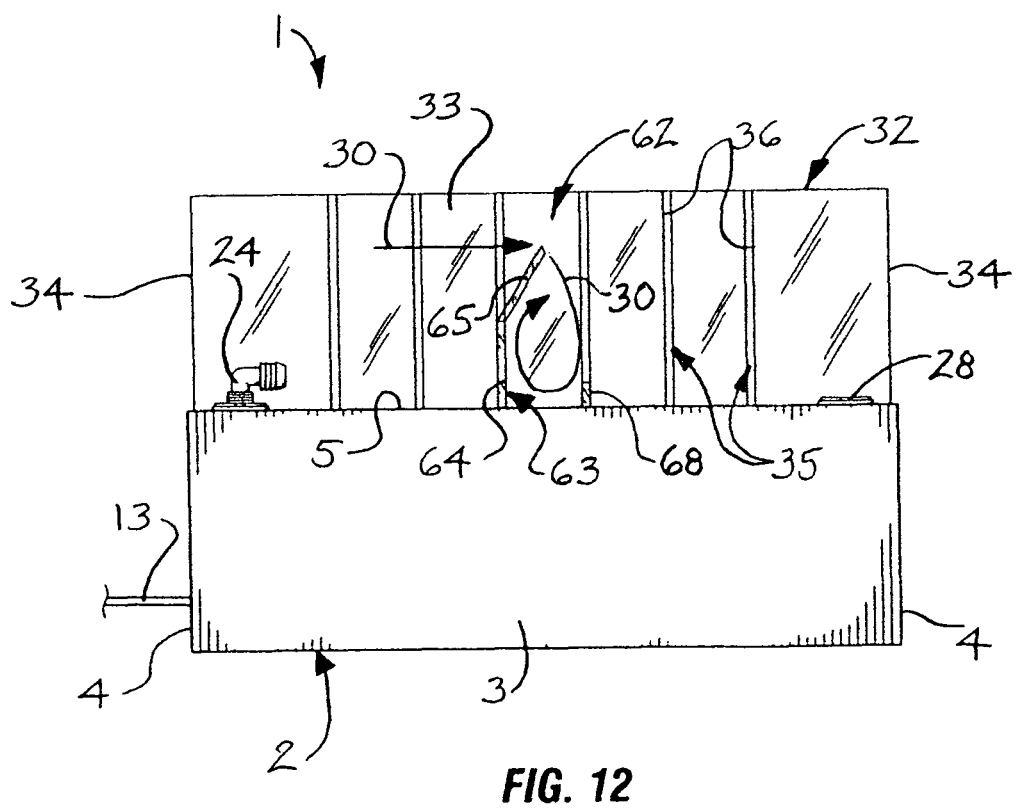
FIG. 12 is a side view of the water flow pattern simulation tank illustrated in FIG. 10, more particularly illustrating a vertical flow pattern of the water as the water flows over the submerged low head dam insert.

Referring next to FIGS. 10-12 of the drawings, in another alternative application of the water flow pattern simulation tank 1, a low head dam insert 62 is inserted into a panel insert groove 35 in the aquarium interior 38 of the tank aquarium 32. In some applications, a bar insert panel 68 may additionally be inserted into an adjacent downstream panel insert groove 35. The low head dam insert 62 may include a low head dam insert panel 63 having a generally rectangular base panel portion 64 and an angled panel portion 65 which extends from the base panel portion 64. The base panel portion 64 may be inserted in the selected panel insert groove 35 with the angled panel portion 65 angled forwardly toward the drains 28. The bar insert panel 68 may be inserted into the panel insert groove 35 which is adjacent to the panel insert groove 35 into which the base panel portion 64 of the low head dam insert panel 63 is inserted. Accordingly, the low head dam insert 62 and the bar insert panel 68 may simulate a submerged low head dam in a flowing water body.

As it flows through the aquarium interior 38 from the nozzles 24 to the drains 28, the water 30 encounters the low head dam insert 62 and forms a water flow pattern which is distinctive to the configuration of the low head dam insert 62. Accordingly, as illustrated in FIGS. 11 and 12, the water 30 flows over the angled panel portion 65 of the low head dam insert panel 63. As illustrated in FIG. 12, the water 30 falls and tumbles over the front edge of the angled panel portion 65 similar to a waterfall and strikes the bar insert panel 68 such that the water 30 flows in a circular pattern. Therefore, the water flow pattern which is characterized by the forward-falling and circular-flowing water 30 in the tank aquarium 32 would indicate that a structure or structures which resemble(s) the low head dam insert 62 is submerged beneath a flowing water body in the event that the participants were to observe the same water flow pattern while participating in a water sport on a flowing water body. An instructor can then instruct the participants to get out of the floating vessel, remove the floating vessel from the flowing water body, walk around the low head dam which is represented by the low head dam insert 62 and return the floating vessel to the flowing water body on the downstream side of the low head dam to avoid damage to the floating vessel or injury to the participant or participants, for example.

Figure 13:
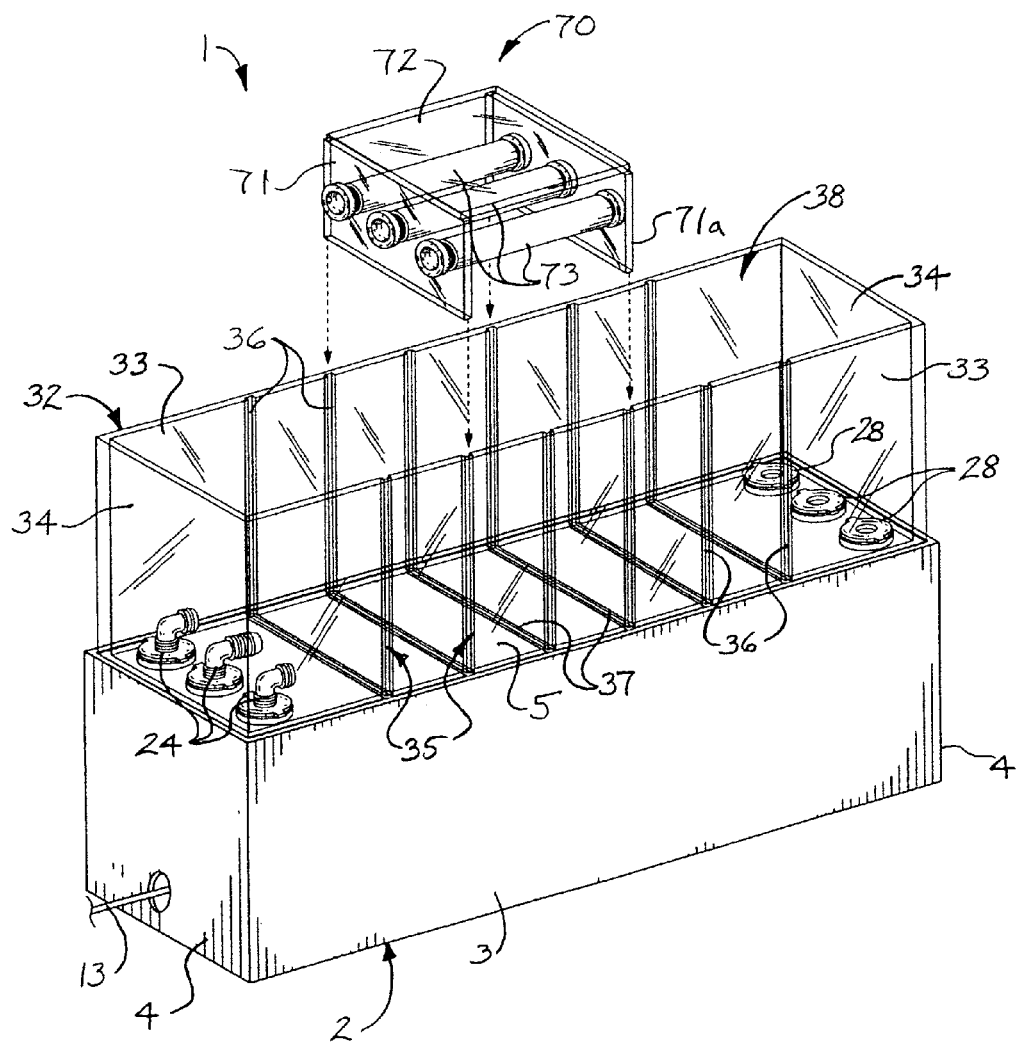
FIG. 13 is an exploded perspective view of an illustrative embodiment of the water flow pattern simulation tank, more particularly illustrating insertion of a low water bridge insert into the tank to simulate the water flow pattern which would be produced by a low water bridge submerged beneath a body of flowing water.
Figure 14:
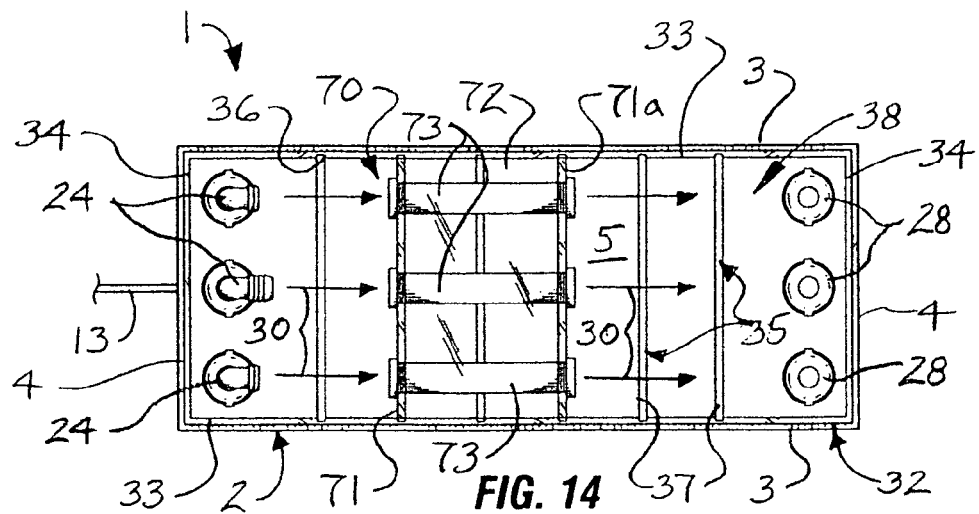
FIG. 14 is a top view of the water flow pattern simulation tank illustrated in FIG. 13, more particularly illustrating a horizontal flow pattern of the water as the water flows over the submerged low water bridge.
Figure 15:
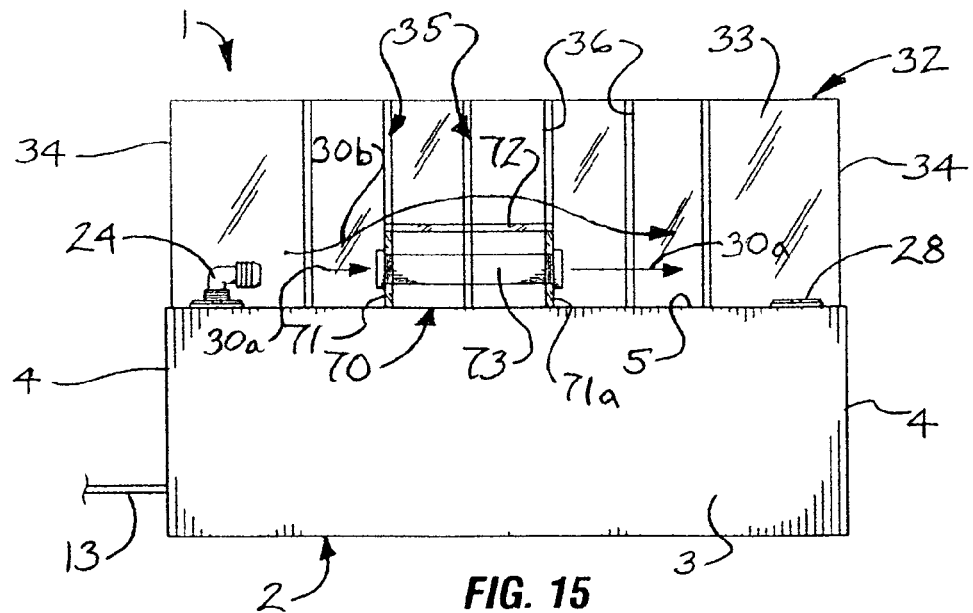
FIG. 15 is a side view of the water flow pattern simulation tank illustrated in FIG. 13, more particularly illustrating a vertical flow pattern of the water as the water flows over the submerged low water bridge.

Referring next to FIGS. 13-15 of the drawings, in still another alternative application of the water flow pattern simulation tank 1, a low water bridge insert 70 is inserted into respective panel insert grooves 35 in the aquarium interior 38 of the tank aquarium 32. The low water bridge insert 70 may include a pair of generally elongated, parallel, rectangular front and rear insert panels 71 and 71*a*, respectively, and a top insert panel 72 which spans the front and rear insert panels 71 and 71*a*. At least one and preferably multiple insert conduits 73 may extend through registering openings (not illustrated) in the side insert panels 71, 71*a* beneath the top insert panel 72. Accordingly, the low water bridge insert 70 may simulate a low water bridge submerged in a flowing water body.

As it flows through the aquarium interior 38 from the nozzles 24 to the drains 28, the water 30 encounters the low water bridge insert 70, forming a water flow pattern which is distinctive to the configuration of the low water bridge insert 70. Accordingly, as illustrated in FIGS. 14 and 15, a first portion 30*a* of the water 30 flows straight through the insert conduits 73 in the low water bridge insert 70. A second portion 30*b* of the water 30 flows over the top insert panel 72 of the low water bridge insert 70. Therefore, the water flow pattern which is characterized by the flowing water 30 in the tank aquarium 32 would indicate that a low water bridge or like structure is submerged beneath a flowing water body in the event that the participants observe the same water flow pattern while participating in a water sport on a flowing water body. An instructor can instruct the participants to get out of the floating vessel, remove the floating vessel from the flowing water body, walk around the low water bridge which is represented by the low water bridge insert 70 and return the floating vessel to the flowing water body on the downstream side of the low water bridge to prevent the vessel from becoming stuck or damaged, for example.

Figure 17:
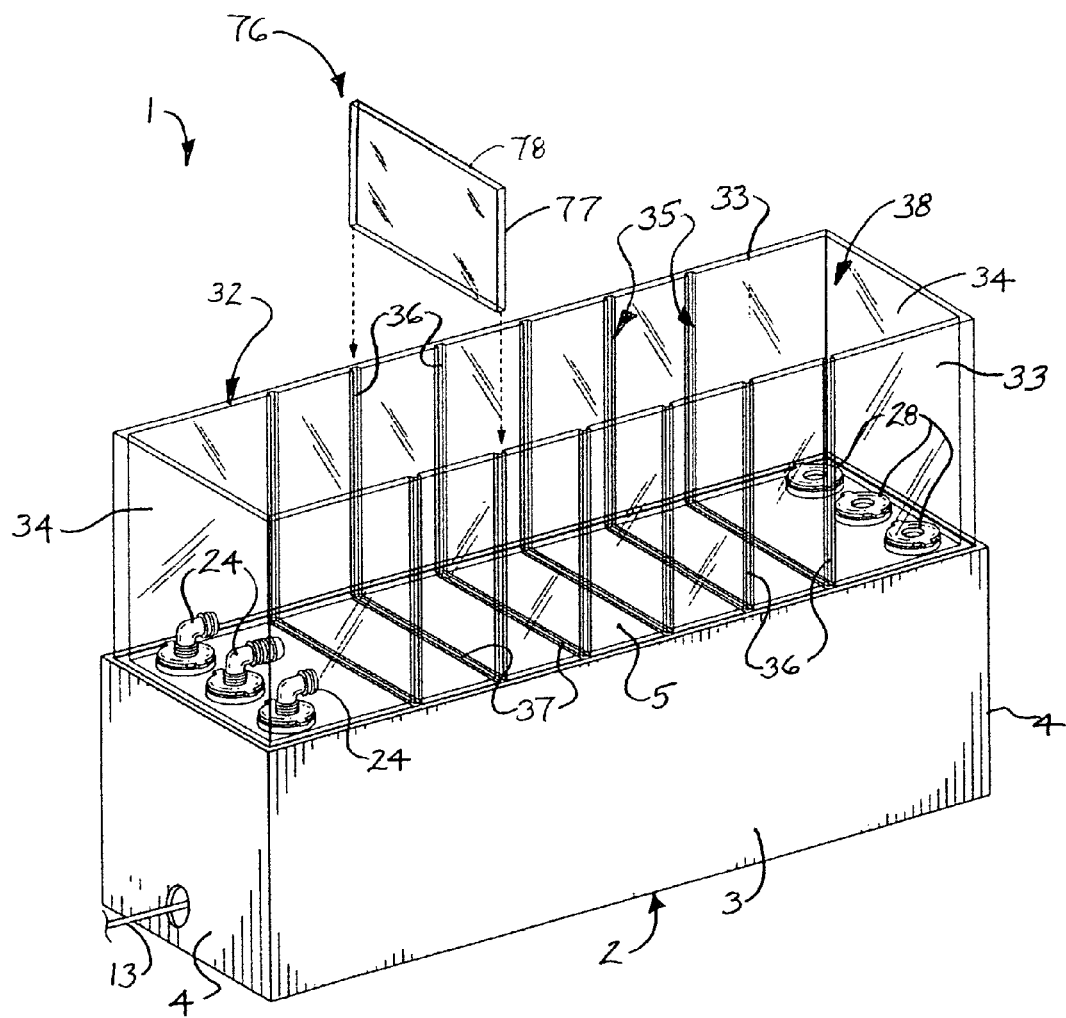
FIG. 17 is an exploded perspective view of an illustrative embodiment of the water flow pattern simulation tank, more particularly illustrating insertion of a hydraulic insert into the tank to simulate a water flow pattern which would be produced by a rock or other surface or structure submerged beneath a body of flowing water.
Figure 18:
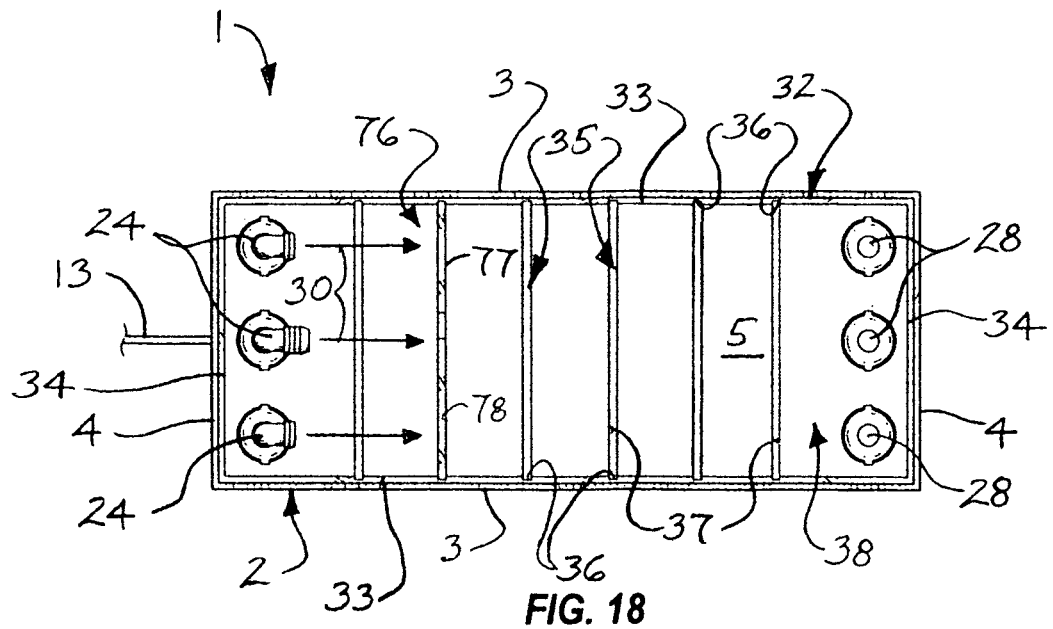
FIG. 18 is a top view of the water flow pattern simulation tank illustrated in FIG. 17, more particularly illustrating a horizontal flow pattern of the water as the water flows over the submerged rock or other surface or structure.
Figure 19:
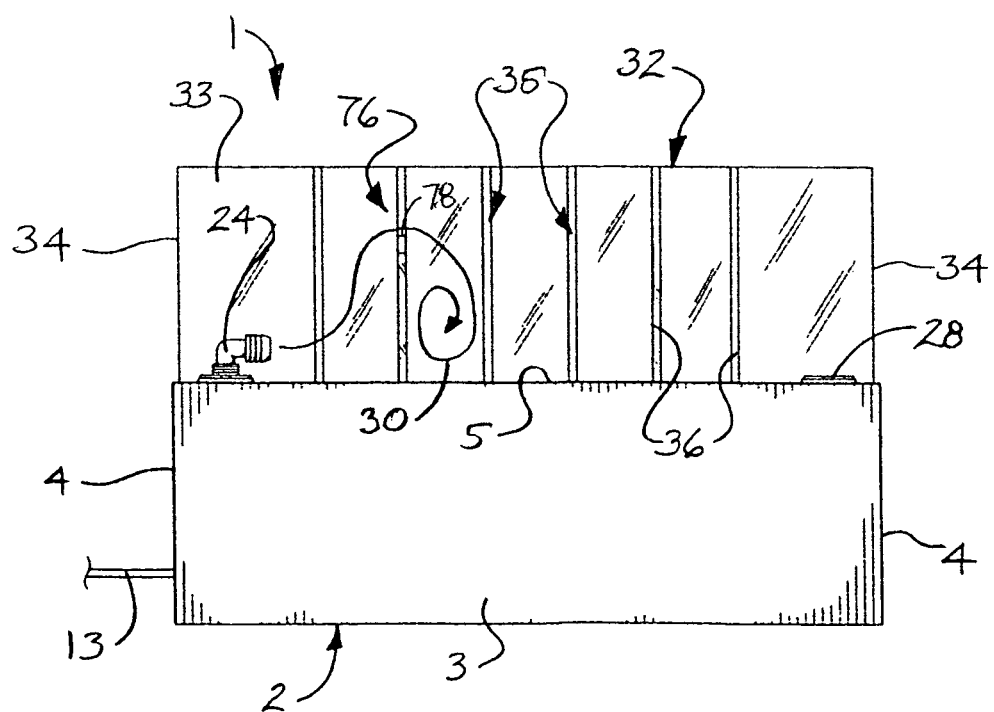
FIG. 19 is a side view of the water flow pattern simulation tank illustrated in FIG. 17, more particularly illustrating a vertical flow pattern of the water as the water flows over the submerged rock or other surface or structure.

Referring next to FIGS. 17-19 of the drawings, in yet another alternative application of the water flow pattern simulation tank 1, a hydraulic insert 76 is inserted into a selected panel insert groove 35 in the aquarium interior 38 of the tank aquarium 32. The hydraulic insert 76 may include a generally rectangular hydraulic insert panel 77 having a uniform panel upper edge 78. Accordingly, the hydraulic insert 76 simulates a dam or other structure submerged in a flowing water body.

As it flows through the aquarium interior 38 from the nozzles 24 to the drains 28, the water 30 encounters the hydraulic insert 76, forming a water flow pattern which is distinctive to the configuration of the hydraulic insert 76. Accordingly, as illustrated in FIGS. 18 and 19, the water 30 flows over the panel upper edge 78 of the hydraulic insert panel 77. As illustrated in FIG. 19, the water 30 falls and tumbles in a swirling pattern in front of the hydraulic insert 76 and then flows to the drains 28. The water flow pattern which is characterized by the flowing water 30 in the tank aquarium 32 would indicate that a dam or other structure which resemble(s) the hydraulic insert 76 is submerged beneath a flowing water body in the event that the participants were to observe the same water flow pattern while participating in a water sport on a flowing water body. An instructor can instruct the participants to navigate a floating vessel around the flowing water 30 to prevent the vessel from becoming stuck or damaged, for example.

Figure 20:
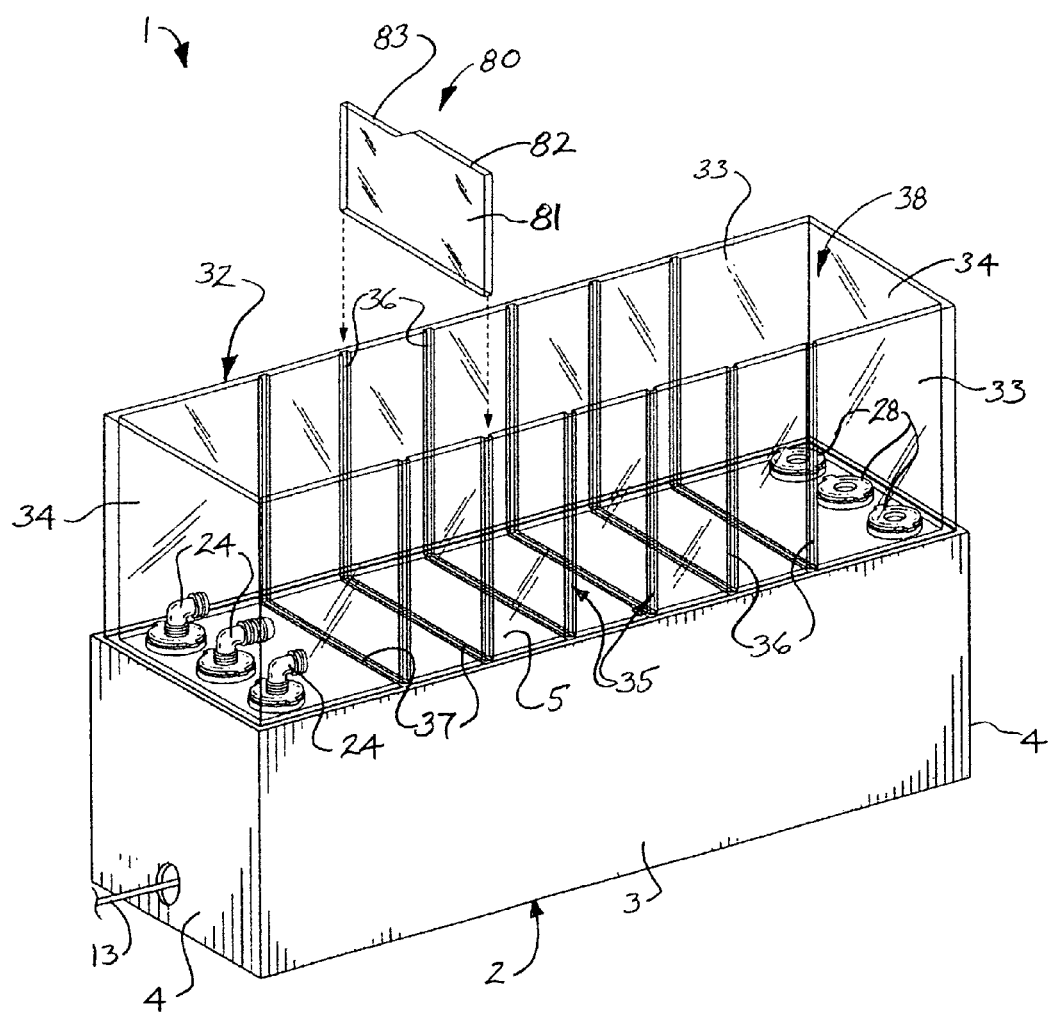
FIG. 20 is an exploded perspective view of an illustrative embodiment of the water flow pattern simulation tank, more particularly illustrating insertion of an eddy insert into the tank to simulate the water flow pattern which would be produced by a rock or other eddy-producing surface or structure submerged beneath a body of flowing water.
Figure 21:
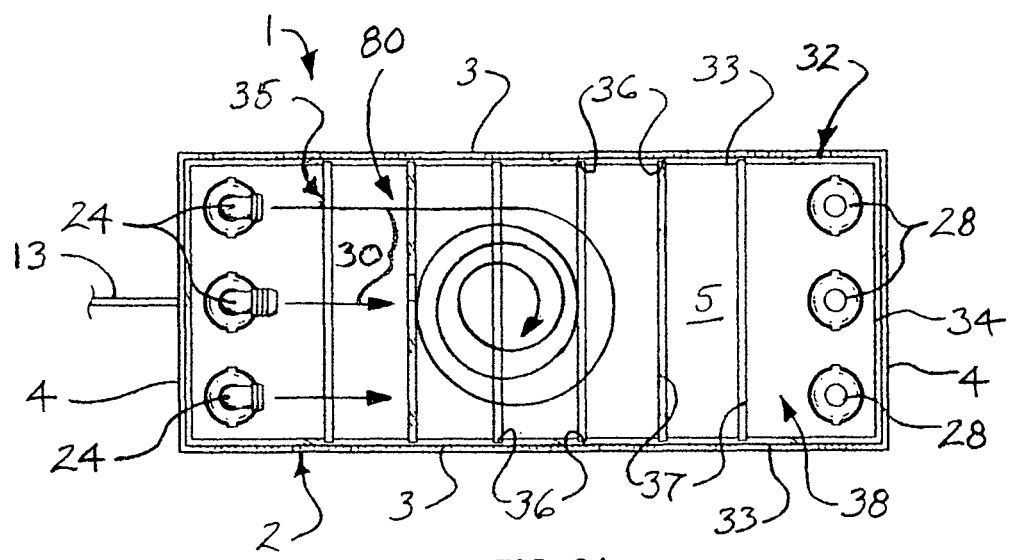
FIG. 21 is a top view of the water flow pattern simulation tank illustrated in FIG. 17, more particularly illustrating a horizontal flow pattern of the water as the water flows over the submerged eddy-producing surface or structure.
Figure 22:
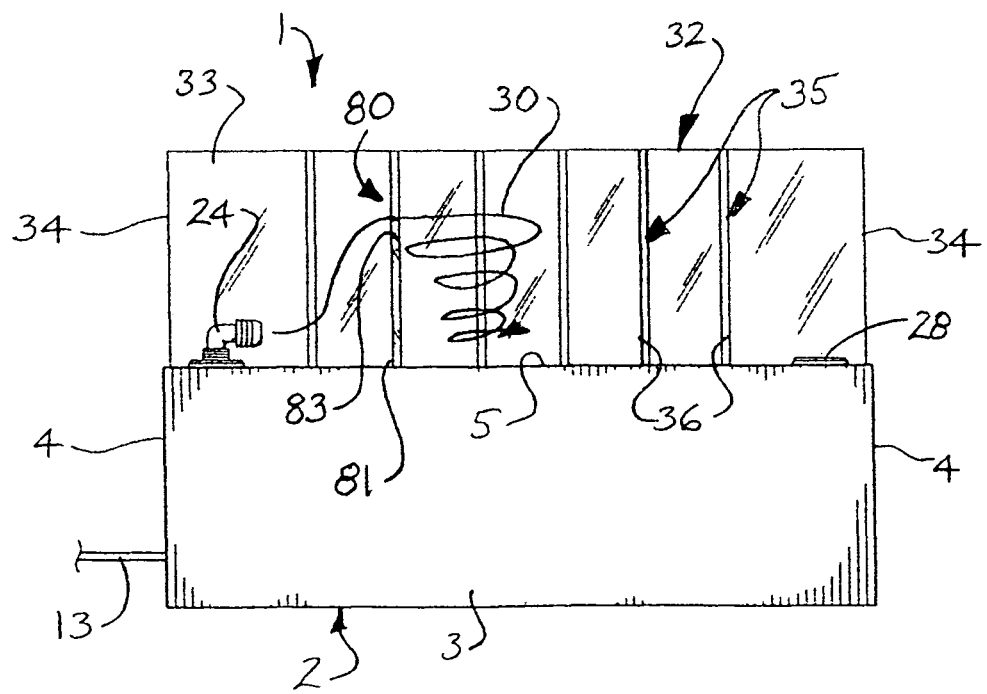
FIG. 22 is a side view of the water flow pattern simulation tank illustrated in FIG. 17, more particularly illustrating a vertical flow pattern of the water as the water flows over the submerged eddy-producing surface or structure.

Referring next to FIGS. 20-22 of the drawings, in still another alternative application of the water flow pattern simulation tank 1, an eddy insert 80 is inserted into a selective panel insert groove 35 in the aquarium interior 38 of the tank aquarium 32. The eddy insert 80 may include a generally rectangular eddy insert panel 81 having a panel upper edge 82. A panel notch 83 is provided in the panel upper edge 82 at one side of the eddy insert panel 81 of the eddy insert 80. Accordingly, the eddy insert 80 simulates a submerged structure which produces an eddy current in a flowing water body.

As it flows through the aquarium interior 38 from the nozzles 24 to the drains 28, the water 30 encounters the eddy insert 80, forming a water flow pattern which is distinctive to the configuration of the eddy insert 80. Accordingly, as illustrated in FIGS. 21 and 22, the water 30 flows through the panel notch 83 in the upper panel edge 82 of the eddy insert panel 81 but is substantially impeded by the eddy insert panel 81 along areas which are adjacent to the panel notch 83. Thus, the water 30 forms an eddy or whirlpool on the downstream side of the eddy insert 80. The direction of rotation of the eddy depends on the side of the eddy insert panel 81 on which the panel notch 83 is located. In the example illustrated in FIGS. 20-22, the panel notch 83 is located on the left-hand side of the eddy insert panel 81 and the eddy thus rotates in a clockwise direction, as illustrated in FIG. 21. Conversely, in the event that the panel notch 83 is located on the right-hand side of the eddy insert panel 81, the eddy rotates in a counterclockwise direction. Therefore, the water flow pattern which is characterized by the eddy or whirlpool in the tank aquarium 32 would indicate that a structure or structures which resemble(s) the eddy insert 80 is beneath a flowing water body in the event that the participants were to observe the same water flow pattern while participating in a water sport on a flowing water body. An instructor can instruct the participants to navigate a floating vessel around the eddy to avoid damage to the vessel and/or injury to the participants.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A water flow pattern simulation tank, comprising:
   a tank base;
   a tank aquarium having an aquarium interior carried by said tank base;
   at least one nozzle in said tank aquarium;
   at least one drain in said tank aquarium in spaced-apart relationship to said at least one nozzle;
   a pump disposed in fluid communication with said at least one nozzle and said at least one drain; and
   at least one insert placed in said tank aquarium generally between said at least one nozzle and said at least one drain, said at least one insert including at least one of the following:
      a strainer insert including a strainer insert frame having a strainer mesh;
      a plurality of downstream inserts having a plurality of panel notches, respectively;
      a pair of meandering inserts having a pair of misaligned panel notches, respectively;
      a low head dam insert having a base panel portion and an angled panel portion carried by said base panel portion;
      a low water bridge insert having a pair of spaced-apart insert panels and at least one insert conduit extending through and between said insert panels;
      a hydraulic insert having a generally rectangular hydraulic insert panel; and
      an eddy insert having an eddy insert panel and a panel notch in said eddy insert panel.

2. The water flow pattern simulation tank of claim 1 further comprising at least one panel insert groove in said aquarium interior and wherein said at least one insert is inserted in said at least one panel insert groove.

3. The water flow pattern simulation tank of claim 2 wherein said at least one panel insert groove comprises a pair of spaced-apart side insert grooves in said tank aquarium.

4. The water flow pattern simulation tank of claim 3 wherein said at least one panel insert groove further comprises a bottom insert groove in said tank base and registering with said side insert grooves.

5. The water flow pattern simulation tank of claim 1 wherein said at least one insert comprises said strainer insert.

6. The water flow pattern simulation tank of claim 1 wherein said at least one insert comprises said plurality of downstream inserts.

7. The water flow pattern simulation tank of claim 1 wherein said at least one insert comprises said pair of meandering inserts.

8. The water flow pattern simulation tank of claim 1 wherein said at least one insert comprises said low head dam insert.

9. The water flow pattern simulation tank of claim 8 wherein said at least one insert further comprises a bar insert panel generally adjacent to said low head dam insert.

10. The water flow pattern simulation tank of claim 1 wherein said at least one insert comprises said low water bridge insert.

11. The water flow pattern simulation tank of claim 1 wherein said at least one insert comprises said hydraulic insert having.

12. The water flow pattern simulation tank of claim 1 wherein said at least one insert comprises said eddy insert.

13. A water flow pattern simulation tank, comprising:
   a tank base;
   a tank aquarium carried by said tank base and including:
      a pair of generally elongated, parallel, spaced-apart aquarium side walls and a pair of aquarium end walls extending between said aquarium side walls; and
      an aquarium interior defined by and between said aquarium side walls and said aquarium end walls;
   at least one nozzle in said aquarium interior of said tank aquarium;
   at least one drain in said aquarium interior of said tank aquarium in spaced-apart relationship to said at least one nozzle;
   a pump disposed in fluid communication with said at least one nozzle and said at least one drain;
   a plurality of inserts removably, individually and interchangeably placed in said aquarium interior of said tank aquarium generally between said at least one nozzle and said at least one drain, said plurality of inserts comprising:
      a strainer insert including a strainer insert frame having a strainer mesh;
      a plurality of downstream inserts having a plurality of panel notches, respectively;
      a pair of meandering inserts having a pair of misaligned panel notches, respectively;
      a low head dam insert having a base panel portion and an angled panel portion carried by said base panel portion;
      a low water bridge insert having a pair of spaced-apart insert panels and at least one insert conduit extending through and between said insert panels;

a hydraulic insert having a generally rectangular hydraulic insert panel; and an eddy insert having an eddy insert panel and a panel notch in said eddy insert panel.

14. The water flow pattern simulation tank of claim 13 further comprising at least one panel insert groove in said aquarium interior and wherein said at least one insert is inserted in said at least one panel insert groove.

15. The water flow pattern simulation tank of claim 14 wherein said at least one panel insert groove comprises a pair of spaced-apart side insert grooves in said aquarium side walls, respectively, of said tank aquarium.

16. The water flow pattern simulation tank of claim 15 wherein said at least one panel insert groove further comprises a bottom insert groove in said tank base and registering with said side insert grooves.

17. A water flow pattern simulation tank, comprising:

a tank base;

a tank aquarium carried by said tank base and including:
- a pair of generally elongated, parallel, spaced-apart aquarium side walls and a pair of aquarium end walls extending between said aquarium side walls; and
- an aquarium interior defined by and between said aquarium side walls and said aquarium end walls;

at least one nozzle in said aquarium interior of said tank aquarium;

at least one drain in said aquarium interior of said tank aquarium in spaced-apart relationship to said at least one nozzle;

a pump disposed in fluid communication with said at least one nozzle and said at least one drain;

a drain spigot disposed in fluid communication with said aquarium interior of said tank aquarium;

a plurality of inserts removably, individually and interchangeably placed in said aquarium interior of said tank aquarium generally between said at least one nozzle and said at least one drain, said plurality of inserts comprising:
- a strainer insert including a strainer insert frame having a strainer mesh;
- a plurality of downstream inserts having a plurality of panel notches, respectively;
- a pair of meandering inserts having a pair of misaligned panel notches, respectively;
- a low head dam insert having a base panel portion and an angled panel portion carried by said base panel portion;
- a low water bridge insert having a pair of spaced-apart insert panels and at least one insert conduit extending through and between said insert panels;
- a hydraulic insert having a generally rectangular hydraulic insert panel; and
- an eddy insert having an eddy insert panel and a panel notch in said eddy insert panel.

18. The water flow simulation tank of claim 17 further comprising at least one panel insert groove in said aquarium interior and wherein said at least one insert is inserted in said at least one panel insert groove.

19. The water flow pattern simulation tank of claim 18 wherein said at least one panel insert groove comprises a pair of spaced-apart side insert grooves in said aquarium side walls, respectively, of said tank aquarium.

20. The water flow pattern simulation tank of claim 19 wherein said at least one panel insert groove further comprises a bottom insert groove in said tank base and registering with said side insert grooves.

* * * * *